United States Patent Office.

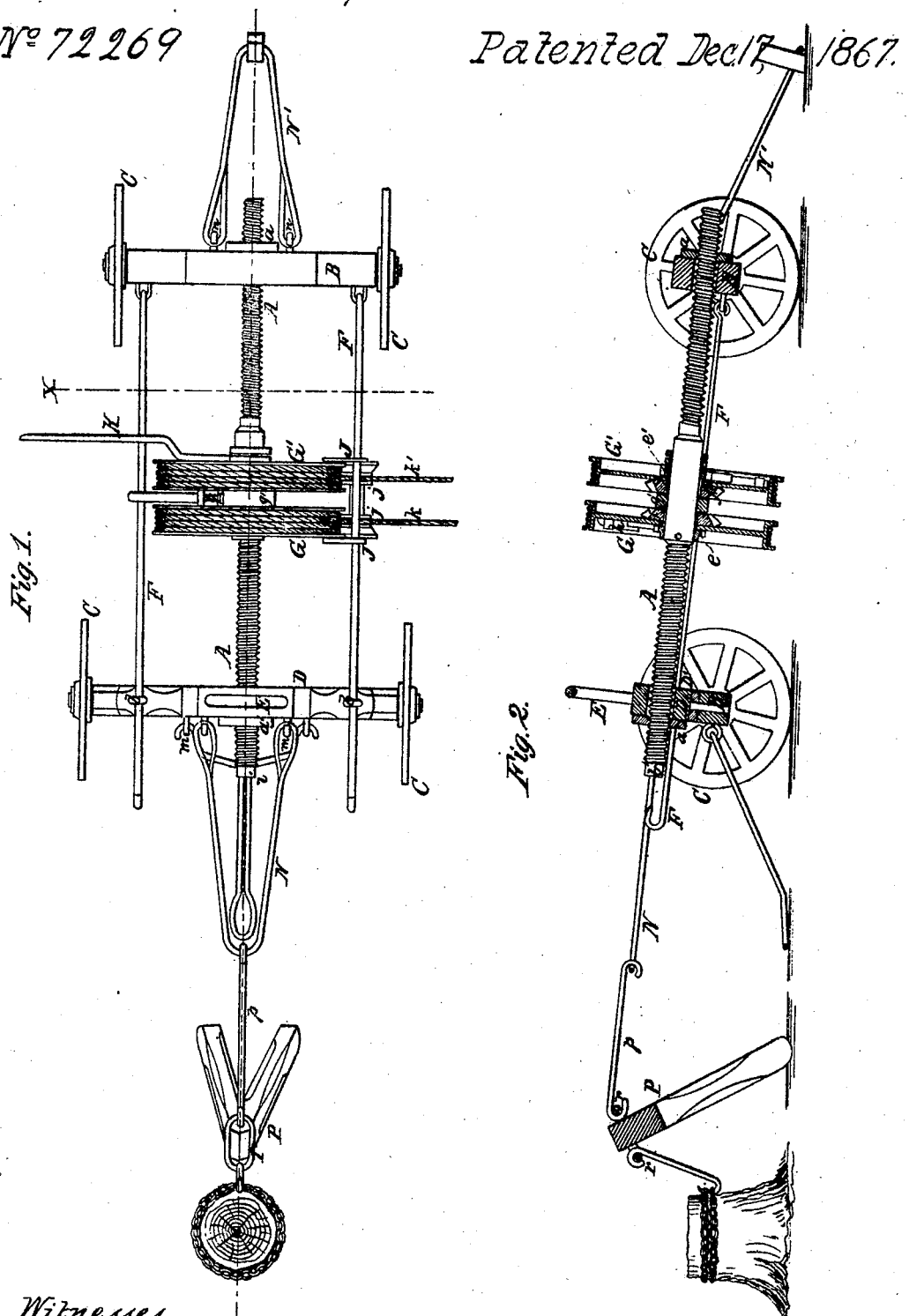

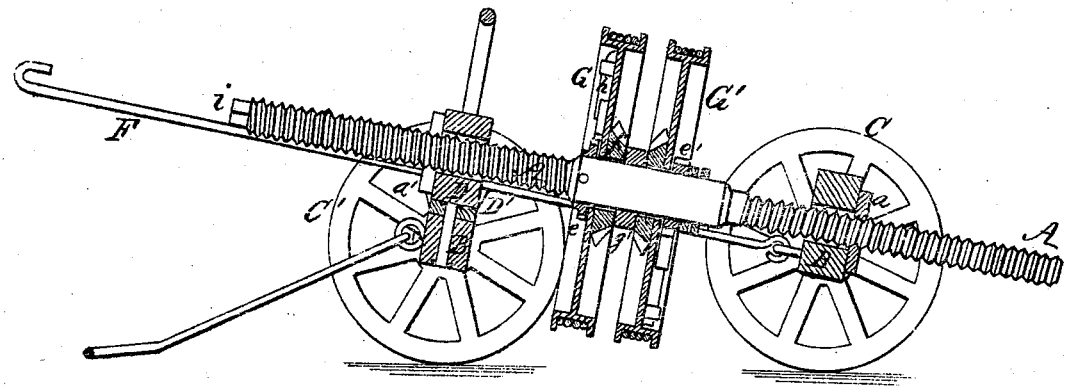
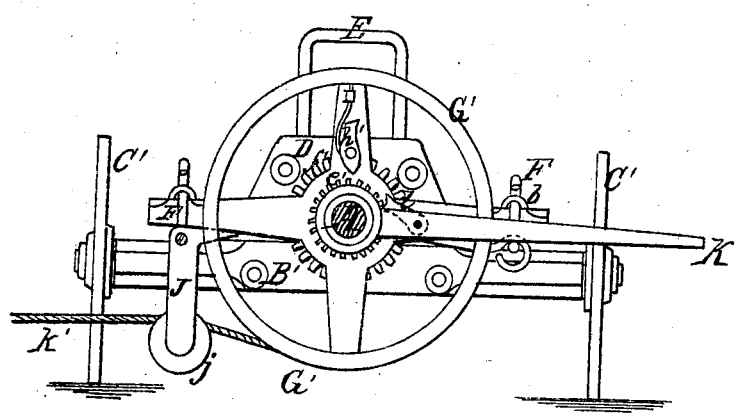

ALONZO CROWNER, OF WELLSVILLE, NEW YORK.

Letters Patent No. 72,269, dated December 17, 1867.

---

IMPROVEMENT IN STUMP-EXTRACTORS.

---

The Schedule referred to in these Letters Patent and making part of the same.

---

TO ALL WHOM IT MAY CONCERN:

Be it known that I, ALONZO CROWNER, of Wellsville, in the county of Alleghany, and State of New York, have invented a new and improved Machine for Extracting Stumps and Stones; and I do hereby declare that the following is a full, clear, and exact description thereof, reference being had to the accompanying drawings, making a part of this specification, in which—

Figure 1 is a plan view of the machine arranged for extracting a stump.

Figure 2 is a vertical section taken longitudinally through the centre of the machine arranged ready to commence the operation of extracting a stump.

Figure 3 is a similar section through the machine, showing both supports adjusted near the drums.

Figure 4 is a transverse section taken through the machine in the plane indicated by red line $x$ in fig. 1.

Similar letters of reference indicate corresponding parts in the several figures.

This invention relates to certain novel improvements on machinery which is designed for extracting stumps and large stones for clearing land. The nature of my invention consists in the direct application of screw-power for extracting stumps and stones by having a strong screw-shaft, which is provided with means for turning it, mounted upon trucks, one of which is to be staked to the ground and the other fastened in a suitable manner to the stump or stone which is to be extracted, so that when the screw-shaft is rotated the trucks will be caused to approach each other, and the stump or stone thereby extracted, as will be hereinafter described.

To enable others skilled in the art to understand my invention, I will describe its construction and operation.

In the accompanying drawings, A represents a right and left-hand screw-shaft of suitable length and strength, the ends of which are tapped through nuts or plates, $a\ a'$, applied to two trucks, as shown. The nut $a$ is applied to the rear side and in the middle of the length of a strong axle, B, which is mounted upon two wheels, $c\ c$, and the nut $a'$ is applied to a head-block, D, which is connected to a bolster, D', by means of a strong staple, E. The bolster D' is centrally pivoted to an axle, B', by a king-pin, which axle is mounted upon two wheels $c'\ c'$. The legs of the staple E pass through the head-block D on both sides of the screw-shaft A, and the ends of this staple are firmly secured to the bolster, so that the head-block can be raised or lowered and sustained at any desired height by placing blocks between it and the bolster. Near the extremities of the rear axle B, and on the front side thereof, rods, F F, are suitably attached, which rods are somewhat longer than the greatest distance allowed between the two axles B B'. These rods pass through eyes $b\ b$ on top and near the extremities of the bolster D', and have hooks or heads on their front ends. On each side of the middle of the length of the screw-shaft A, and securely keyed to this shaft, are a right and left ratchet-wheel, and between these two wheels two large flanged drums G G' are applied, so as to turn loosely when not engaged with the ratchet-wheels $e\ e'$. On the inner faces of the drums G G' bevel-spur wheels, $f\ f'$, are secured, the teeth of which engage with a pinion-wheel, $g$, on a transverse shaft, which has its end bearings upon one of the longitudinal rods F and a collar, $g'$, on shaft A. By thus connecting the drums together, one will be caused to rotate to the right when the other is rotated toward the left, and *vice versa*. The drum G has a pawl, $h$, pivoted to the outer face of one of its spokes, which pawl will engage with the teeth of the ratchet-wheel $e$ and turn the shaft A in one direction only. On the outer side of the drum G', and pivoted to one of its spokes, is a pawl, $h'$, which, when it is engaged with its ratchet-wheel $e$, will turn shaft A in the same direction mentioned above. Ropes or chains, $k\ k'$, are wound around the flanged drums G G' for the purpose of rotating them, which ropes pass off between guides J J, and over grooved rollers $j\ j$, which have their bearings between these guides. The guides have arms projecting from their upper ends, and extending inward alongside of the drums G G', thereby keeping the guides and rollers always in the same relative position with respect to said drums. Said guides being hung from one of the rods F, as shown in fig. 4, this rod will slide freely through them as the trucks are moved toward and from each other. On the outer side of the drum G', and applied so as to vibrate freely on the shaft A, is a lever, $k$, carrying a right and left-hand pawl, $l$, which, when engaged with the ratchet-wheel $e'$, will admit of the shaft A being turned either to the right or left, as may be desired. When lever $k$ is thus used, the pawls on the drums are disengaged from their ratchet-wheels $e\ e'$. On the front end of the screw-shaft A, a square tenon, $i$, is formed for receiving a crank, by which the screw-shaft can be rapidly rotated for adjusting and setting the machine for operation.

On the front side of the head-block D, and at equal distances on each side of the axis of shaft A, hooks *m m* are firmly secured for receiving a yoke, N, and on the rear side of the rear axle B, hooks *n n* are firmly secured for receiving a similar yoke, N'. The yoke N' is staked to the ground at a proper distance from a stump which is to be extracted, and the two axles B B' adjusted at a proper distance apart, as shown in figs. 1 and 2, by turning the screw-shaft A with the crank, as above mentioned. The head-block D is then attached to the inclined prop P by means of a link, *p*, hooking to an eye, *r*, on said prop, and attached to the yoke N. This prop is then connected in a suitable manner to the stump or stone to be extracted, after which the screw A is rotated by the means above described, which will slowly but forcibly move the two axles B B' toward each other, and thus extract the stump or stone. The prop P is used so that the power can be applied to a much better advantage than could be done without it. The prop is inclined at the commencement of the operation, and as the axles or trucks are slowly drawn toward each other, the prop will assume an upright position, thus drawing upward, as well as laterally. The head-block D is so applied to the bolster upon axle B' that this head-block can rise or fall during the operation of extracting a stump or stone, and thereby keep the screw-shaft A in a line with the line of draught.

Having described my invention, what I claim as new, and desire to secure by Letters Patent, is—

1. The screw-shaft A, applied to transporting-trucks, and provided with means for rotating it, for the purpose of extracting stumps and stones, substantially as described.

2. Providing a screw-shaft, A, which is applied to two trucks, substantially as described, with drums G G' connected together by spur-wheels, so as to rotate in opposite directions, in combination with right and left pawls *h h'* and ratchet-wheels *e e'*, substantially as and for the purposes described.

3. The pendent guides J J, for supporting pulleys *j j*, over which the ropes *k k'* of drums G G' pass, in combination with a machine operating substantially as described.

4. Sustaining the front end of the screw-shaft upon or by means of a head-block, D, which is attached to a bolster, D', by a staple, E, so that it can rise and fall, substantially as described.

5. The combination of the screw A, nut *a'*, and prop P, substantially in the manner and for the purpose herein described.

6. The combination of rods F F with a right and left screw-shaft A, which is supported upon trucks, and operated substantially as described.

ALONZO CROWNER.

Witnesses:
I. J. ELLIOTT,
HENRY WILLIAMS.